(12) United States Patent
Keller

(10) Patent No.: US 10,085,429 B2
(45) Date of Patent: Oct. 2, 2018

(54) CORNER BRACKET, A FRAME ASSEMBLY USING CORNER BRACKETS AND AN AQUARIUM UTILIZING SAID FRAME ASSEMBLY

(71) Applicant: Adam John Keller, Fremont, WI (US)

(72) Inventor: Adam John Keller, Fremont, WI (US)

( * ) Notice: Subject to any disclaimer, the term of this patent is extended or adjusted under 35 U.S.C. 154(b) by 513 days.

(21) Appl. No.: 14/875,913

(22) Filed: Oct. 6, 2015

(65) Prior Publication Data

US 2017/0094952 A1    Apr. 6, 2017

(51) Int. Cl.
*F16B 12/44*    (2006.01)
*A01K 63/00*    (2017.01)
*E05D 15/06*    (2006.01)
*F16B 11/00*    (2006.01)

(52) U.S. Cl.
CPC ............ *A01K 63/006* (2013.01); *E05D 15/06* (2013.01); *F16B 11/008* (2013.01); *E05D 15/0621* (2013.01)

(58) Field of Classification Search
CPC ............ A47B 47/0008; A47B 2230/01; A47B 47/005; A47B 2230/03; F16B 2012/446; F16B 2012/443; E06B 3/9642; E06B 3/9681
See application file for complete search history.

(56) References Cited

U.S. PATENT DOCUMENTS

| 3,103,374 | A | | 9/1963 | Portnoy | |
|---|---|---|---|---|---|
| 3,195,968 | A | | 7/1965 | Freeman | |
| 3,544,181 | A | * | 12/1970 | Schottland | A47F 3/005 312/114 |
| 3,711,133 | A | | 1/1973 | Werner | |
| 3,854,831 | A | | 12/1974 | Gutner | |
| 4,021,127 | A | * | 5/1977 | Gasparro | A47B 47/005 403/171 |
| 4,299,508 | A | | 11/1981 | Kerscher et al. | |
| 4,323,319 | A | | 4/1982 | Adams | |
| 4,368,998 | A | | 1/1983 | Pestoor | |
| 4,516,376 | A | | 5/1985 | King | |
| 4,630,550 | A | * | 12/1986 | Weitzman | A47B 13/06 108/155 |

(Continued)

OTHER PUBLICATIONS

Rocky Mountian, Quick Frame Technical Data, 2014, 3 pages, Westmill Industries, Canada.

*Primary Examiner* — Bradley Duckworth
(74) *Attorney, Agent, or Firm* — Thomas J. Connelly; Northwind IP Law, S.C.

(57) ABSTRACT

A corner bracket, a frame assembly using corner brackets, and an aquarium utilizing the frame assembly are disclosed. The corner bracket includes a hollow base member having first and second hollow coupling members projecting outward therefrom. The first and second hollow coupling members are used to secure hollow frame members together using an expandable adhesive. Four hollow frame members and four corner brackets can form a frame assembly, typically having a rectangular configuration. The frame assembly supports a pair of doors, each enclosed by a door frame, which can slide back and forth on the frame assembly. The frame assembly can be secured to both a front wall and to a pair of sidewalls of an enclosure having an open top. A cover can close the open top to form an aquarium for amphibians.

5 Claims, 2 Drawing Sheets

(56) References Cited

U.S. PATENT DOCUMENTS

| | | | | |
|---|---|---|---|---|
| 6,205,738 B1* | 3/2001 | Chen | ............... | E04C 3/28 |
| | | | | 312/265.4 |
| 7,883,288 B2 | 2/2011 | Jorna | | |
| 8,671,644 B2* | 3/2014 | Huang | ............... | A47B 13/06 |
| | | | | 108/155 |
| 9,261,122 B2* | 2/2016 | Choy | ............... | A47B 47/0008 |
| 9,845,595 B2* | 12/2017 | Bowron | ............... | E04B 1/1903 |
| 9,951,802 B2* | 4/2018 | Keller | ............... | F16B 11/006 |
| 2009/0020669 A1 | 1/2009 | Wang | | |
| 2011/0017691 A1 | 1/2011 | Wu | | |
| 2011/0241502 A1 | 10/2011 | Kao | | |
| 2013/0008865 A1 | 1/2013 | Su | | |
| 2017/0094951 A1* | 4/2017 | Keller | ............... | A01K 63/003 |

* cited by examiner

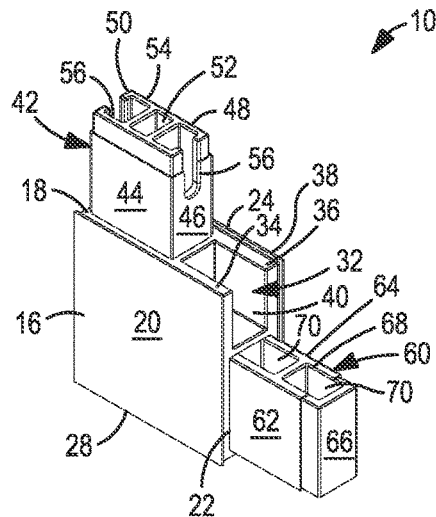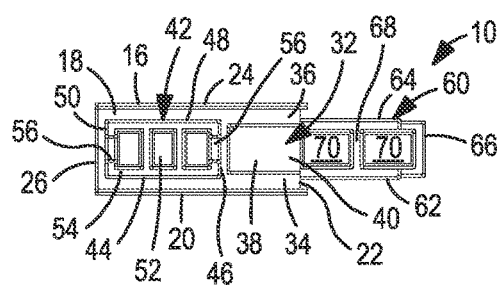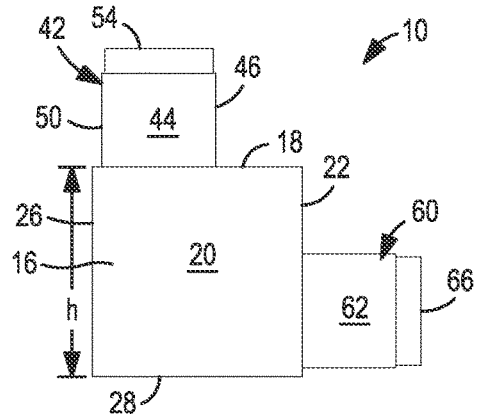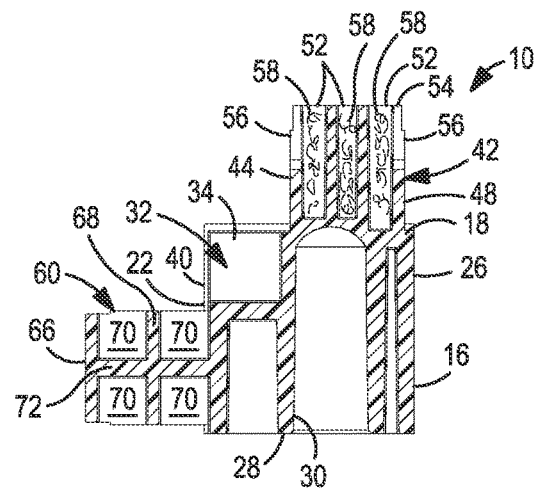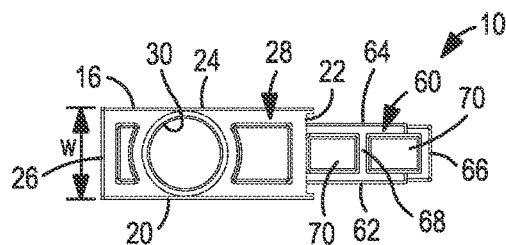
FIG. 1
FIG. 4
FIG. 2
FIG. 5
FIG. 3

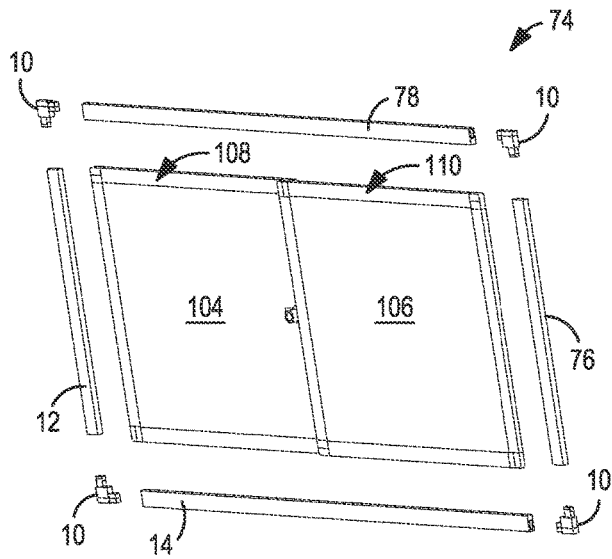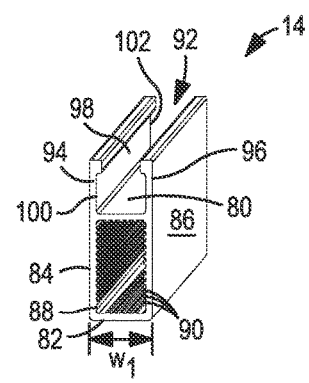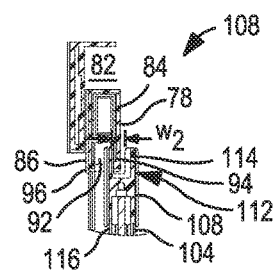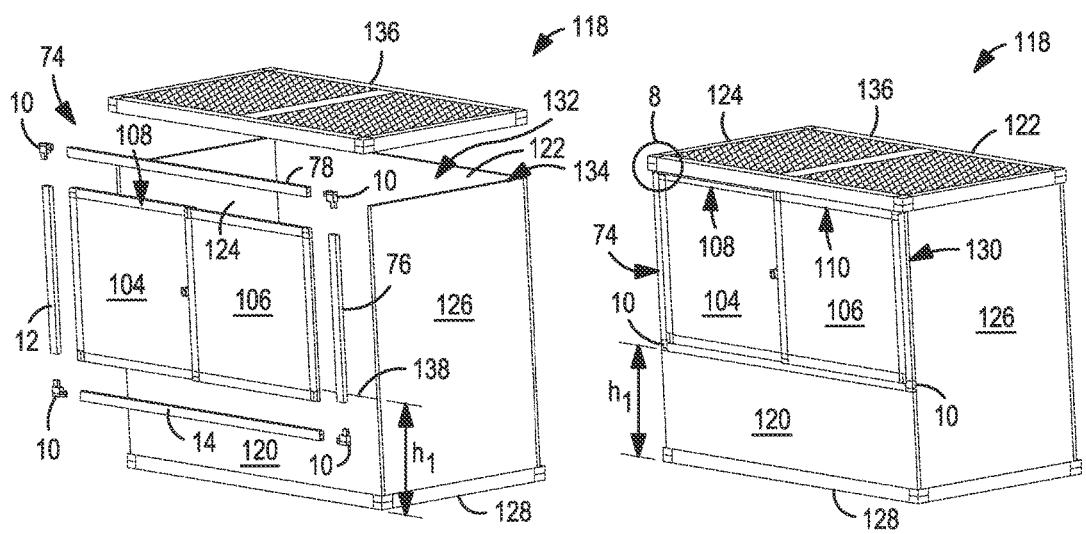
FIG. 6
FIG. 7
FIG. 8
FIG. 9
FIG. 10

CORNER BRACKET, A FRAME ASSEMBLY USING CORNER BRACKETS AND AN AQUARIUM UTILIZING SAID FRAME ASSEMBLY

FIELD OF THE INVENTION

This invention relates to a corner bracket, a frame assembly using corner brackets and an aquarium utilizing the frame assembly.

BACKGROUND OF THE INVENTION

Today, many variations of fish aquariums exist. They vary in size, shape, design, configuration and materials from which they are constructed. However, very few aquariums are manufactured to house an amphibian, a lizard or a reptile. Commonly, the owners of such pets simply use a fish aquarium to house their amphibian, turtle, frog, lizard, reptile, etc. By "amphibian" it is meant a cold-blooded, smooth-skinned vertebrate of the class *Amphibia* that hatches as an aquatic larva with gills and transforms into an adult having air-breathing lungs; an animal capable of living both on land and in water. There are more than 4,000 different kinds of amphibians. Members of this class include frogs, toads, salamanders, newts, and caecilians or blind-worms. By "lizard" it is meant any of numerous reptiles of the suborder Sauna or Lacertilia, having a scaly elongated body, movable eyelids, four legs, and a tapering tail. By "turtle" it is meant any of various aquatic or terrestrial reptiles of the order Testudines (or *Chelonia*), having horny toothless jaws and a bony or leathery shell into which the head, limbs and tail can be withdrawn inn most species. By 'reptile' it is meant any of various cold-blooded, usually egg-laying vertebrates of the class Reptilia, such as a snake, having external covering of scales or horny plates and breathing by means of lungs.

Typically, the owners of amphibians need to feed live insects to their pets. Crickets are the most common insect fed to amphibians. By "cricket" it is meant any of various insects of the family Gryllidae, having long antennae and legs adapted to leaping. Because crickets are small and mobile, some tend to escape through the open top of a standard fish aquarium when it is used to house an amphibian.

Another disadvantage of using a standard fish aquarium to house an amphibian, a lizard or a reptile is that an aquarium is only open on its top surface. Ventilation and circulation of fresh air into and out of the aquarium is poor. Furthermore, in a fish aquarium, there is no front door so it is harder to insert live food, to remove the amphibian or to clean the aquarium. Since amphibians can live both on land and in water, the aquarium must contain some platform where the amphibian can rest when it is out of the water. The platform must be located above the water line. Therefore, the entire aquarium does no need to be water tight.

Now, a corner bracket, a frame assembly using corner brackets, and an aquarium utilizing the frame assembly have been invented.

SUMMARY OF THE INVENTION

Briefly, this invention relates to a corner bracket for securing first and second hollow frame members together. The corner bracket includes a hollow base member having a top wall, four sidewalls joined to the top wall, and having an open bottom surface. The hollow base member has a height and has a hollow tube positioned therein which extends parallel to the height. The hollow base member also has a channel with a pair of parallel walls. Each of the pair of parallel walls is an extension of two of the four sidewalls. The channel also has an open top surface and an open end facing away from the hollow base member. Each of the parallel walls of the channel serves as a track for a sliding door. The corner bracket also includes a first hollow coupling member projecting upward from the top wall and being integrally formed therewith. The first hollow coupling member has four sidewalls substantially coincident with the four sidewalls of the hollow base member. The four sidewalls create a hollow core in the first hollow coupling member which has an open upper end. At least one of the four sidewalls of the first hollow coupling member has a longitudinal groove formed there through and the longitudinal groove is aligned parallel to the height of the hollow base member and terminates at the open upper end. The longitudinal groove allows an expandable adhesive, that is placed in the hollow core, to pass there through and contact an inner periphery of the first hollow frame member and hold the first hollow fame member secure to the corner bracket. The corner bracket further includes a second hollow coupling member having a pair of sidewalls formed integral with and projecting out from one of the four sidewalls of the hollow base member. The pair of sidewalls terminates at an end wall. The second hollow coupling member has a transverse partition aligned parallel with the end wall and integral with and connecting mid-portions of the pair of sidewalls. The pair of sidewalls extends to and terminates in parallel planes which are normal to the sidewall of the hollow base member. The transverse partition creates cavities in which an expandable adhesive can be placed and which can contact an inner periphery of the second hollow frame member and hold the second hollow frame member secure to the corner bracket.

The invention also relates to a frame assembly. The frame assembly includes four hollow frame members each having a top wall, a bottom wall and a pair of sidewalls joining the top wall to the bottom wall and forming an inner periphery. Each of the four hollow frame members has a first channel extending upward from the top wall. The first channel has a pair of spaced apart sidewalls with an open top surface and a pair of open ends. At least one of the sidewalls of the first channel is an extension of one of the pair of sidewalls of the hollow frame member. The frame assembly also includes four corner brackets each having a hollow base member with a top wall, four sidewalls joined to the top wall, and having an open bottom surface. The hollow base member has a hollow tube positioned therein and having a height. The hollow tube extends parallel to the height. The hollow base member includes a channel having a pair of spaced apart walls. Each of the pair of spaced apart walls is an extension of two of the four sidewalls. The channel also has an open top surface and an open end facing away from the hollow base member, and each of the pair of spaced apart walls of the channel serves as a track for a sliding door.

The invention further relates to an aquarium which can house an amphibian, a lizard or a reptile. The aquarium has a front wall, a back wall and a pair of sidewalls all extending upward from a bottom wall and being secured thereto. The front wall of the aquarium is shorter in height than the back wall and the pair of sidewalls. The amphibian aquarium also has a frame assembly. The frame assembly includes four hollow frame members each having a top wall, a bottom wall and a pair of sidewalls joining the top wall to the bottom wall and forming an inner periphery. Each of the four hollow frame members has a first channel extending upward from the top wall. The first channel has a pair of spaced apart sidewalls with an open top surface and a pair of open ends, and each of the pair of spaced apart sidewalls of the first channel serve as a track. The aquarium further has four corner brackets, each including a hollow base member having a top wall, four sidewalls joined to the top wall, and having an open bottom surface. The hollow base member has a hollow tube positioned therein and has a height. The hollow tube extends parallel to the height. The hollow base member includes a channel having a pair of spaced apart walls. Each of the pair of spaced apart walls is an extension of two of the four sidewalls. The channel also has an open top surface and an open end facing away from the hollow base member, and each of the pair of spaced apart walls of the channel serves as a track. The frame assembly also has an inner surface which is secured to the front wall and to the pair of sidewalls to form an enclosure with an open top. The aquarium further includes a pair of doors slidably mounted within the frame assembly. Each of the doors can slide on one of the tracks formed by the pair of sidewalls of the first channel and on one of the pair of spaced apart walls of the channel of the corner bracket. Lastly, a cover doses the open top of the enclosure to form the aquarium.

The general object of this invention is to provide a corner bracket, a frame assembly using the corner brackets, and an aquarium utilizing the frame assembly. A more specific object of this invention is to provide a frame assembly which combines four hollow frame members with four corner brackets.

Another object of this invention is to provide a corner bracket which can be used to construct a frame assembly in which a pair of door can slide.

A further object of this invention is to provide a frame assembly which can be adhesively secured to an enclosure to form an aquarium for amphibians.

Still another object of this invention is to provide a frame assembly which will prevent insects from escaping through a pair of doors slidably positioned therein.

Still further, an object of this invention is to provide and economical frame assembly which does not require the two hollow frame members to be notched.

Other objects and advantages of the present invention will become more apparent to those skilled in the art in view of the following description and the accompanying drawings.

BRIEF DESCRIPTION OF THE DRAWINGS

FIG. 1 is a perspective view of a corner bracket.

FIG. 2 is a side view of the corner bracket shown in FIG. 1.

FIG. 3 is a bottom view of the corner bracket shown in FIG. 1.

FIG. 4 is a top view of the corner bracket shown in FIG. 1.

FIG. 5 is a vertical cross-sectional view of the corner bracket shown in FIG. 1 rotated 180 degrees.

FIG. 6 is an exploded view of a frame assembly constructed of four hollow frame members and four corner brackets and enclosing a pair of doors.

FIG. 7 is a perspective view of a hollow frame member.

FIG. 8 is an enlarged cross-sectional view of a door sliding in a hollow frame member.

FIG. 9 is an exploded view of an aquarium for amphibians.

FIG. 10 is a perspective view of an aquarium for amphibians.

DETAILED DESCRIPTION OF THE INVENTION

Referring to FIGS. 1-6, a corner bracket 10 is shown for securing two hollow frame members 12, 14 together. In FIG. 6, the corner bracket 10 secures a first hollow frame member 12 to a second hollow frame member 14. A corner bracket 10 is also used to secure the first hollow frame member 12 to a fourth hollow frame member 878, to secure the second hollow frame member 14 to a third hollow frame members 76, and to secure the third hollow frame member 76 to the fourth hollow frame member 78.

The corner bracket 10 can be constructed from various materials known to those skilled in the art. For example, the corner bracket 10 can be constructed from aluminum, plastic, a thermoplastic, a composite material, fiberglass, nylon, a metal, a metal alloy, steel, a steel alloy, etc. By "nylon" it is meant any of a family of high strength, resilient synthetic polymers containing recurring amide groups. The size, overall shape and color of the corner bracket 10 can vary depending on how it will be utilized. For example, if the corner bracket 10 is used to construct a small frame assembly, it can be relatively, small in size. If the corner bracket 10 is to be used to construct a large frame assembly, it should be larger in size and capable of handling heavier loads.

The corner bracket 10 includes a hollow base member 16 having a top wall 18, four sidewalls 20, 22, 24 and 26 joined to the top wall 18, and having an open bottom surface 28. The hollow base member 16 has a height h, see FIG. 2. A hollow tube 30 is positioned in the hollow base member 16, see FIGS. 3 and 5. The hollow tube 30 extends parallel to the height h. The hollow tube 30 is coincident with two of the four sidewalls 20, 22, 24 and 26. In FIG. 3, the hollow tube 30 contacts and occupies a portion of the same space as the sidewalls 20 and 24. The hollow base member 16 also includes a channel 32 having a pair of parallel walls 34 and 36. The hollow tube 30 can function to support a stud (not shown). The stud can be attached to a wheel, a caster wheel or be anchored to another structure. Each of the pair of parallel walls, 34 and 36 is an extension of two of the four sidewalls 20, 22, 24 and 26. Specifically, the wall 34 is an extension of sidewall 20 and the wall 36 is an extension of sidewall 24. The channel 32 has an open top surface 38 and an open end 40 facing away from the hollow base member 16. Each of the parallel walls, 34 and 36, of the channel 32 serve as a track for a sliding door. The channel 32 functions to allow a pair of sliding members (doors) to interact therewith without the need to notch, cut, bevel or miter a portion of the hollow frame members 12 and 14 so that they can nest with the corner bracket 10.

Referring to FIG. 3, the corner bracket 10 has a width w which is measured perpendicularly to the sidewall 20. The width w is distance between the sidewall 20 and the sidewall 24. The width w is also the distance between the pair of walls 34 and 36 of the channel 32. The width w can vary in dimension. The width w should be at least about 0.25 inches. Desirably, the width w ranges from between about 0.3 inches to about 2 inches. More desirably, the width w ranges from between about 0.4 inches to about 1.5 inches. Even more desirably, the width w ranges from between about 0.5 inches to about 1 inch. Most desirably, the width w is less than about 1 inch.

Referring to FIGS. 1-5, the corner bracket 10 also includes a first hollow coupling member 42 projecting upward from the top wall 18 and being integrally formed therewith. Alternatively, the first hollow coupling member 42 could be secured to the hollow base member 16. The first hollow coupling member 42 has four sidewalls 44, 46, 48 and 50 substantially coincident with the four sidewalls 20, 22, 24 and 26 of the hollow base member 16. The four sidewalls 44, 46, 48 and 50 create a hollow core 52 in the first hollow coupling member 42 which has an open upper end 54. At least one of the four sidewalls 44, 46, 48 and 50 of the first hollow coupling member 42 has a longitudinal groove 56 formed there through. In FIGS. 1, 4 and 5, two longitudinal grooves 56, 56 are shown. One of the longitudinal grooves 56 is formed in the sidewall 46 and the other longitudinal groove 56 is formed in the sidewall 50. Each of the longitudinal grooves 56, 56 is aligned parallel to the height 11 of the hollow base member 16 and each of the longitudinal grooves 56, 56 terminates at the open upper end 54. Each of the longitudinal grooves 56, 56 allows an expandable adhesive 58 placed in the hollow core 52 to pass there through and contact an inner periphery of the first hollow frame member 12 and hold the first hollow frame member 12 secure to the corner bracket 10.

The expandable adhesive 58 can be any expandable adhesive known to those skilled in the art. One commercially available expandable adhesive 58 is GORILLA GLUE® which is a registered trademark of Gorilla Glue Company having an office at 4550 Red Bank Expressway, Cincinnati, Ohio 45227.

It should be understood that one could use a non-expandable adhesive, glue, a mechanical fastener, an interference fit, or simply pressure to secure the corner bracket 10 to the first hollow frame member 12.

Still referring to FIGS. 1-5, the corner bracket 10 further includes a second hollow coupling member 60 having a pair of sidewalls 62 and 64 formed integral with and projecting out from one of the four sidewalls 20, 22, 24 and 26 of the hollow base member 16. In Hg. 1, the pair of sidewalls 62 and 64, project out from the sidewall 22. The pair of sidewalls, 62 and 64, terminates at an end wall 66. The second hollow coupling member 60 also has a transverse partition 68 aligned parallel with the end wall 66 and integral with and connecting mid-portions of the pair of sidewalls 62 and 64. The pair of sidewalls 62 and 64, extend to and terminate in parallel planes which are normal (at 90 degrees) to the sidewall 22 of the hollow base member 16. The transverse partition 68 creates two cavities 70, 70 into which an expandable adhesive 58 can be placed. The expandable adhesive 58 will be able to contact an inner periphery of the second hollow frame member 14 and hold the second hollow frame member 14 secure to the corner bracket 10.

Referring now to FIG. 5, an optional second partition 72 is shown which extends horizontally across the second hollow coupling member 60 and intersects with the transverse partition 68. The second partition 72 creates two additional cavities 70, 70 in the second hollow coupling member 60. A total of four cavities 70, 70, 70 and 70 are shown. The second partition 72 reduces the overall sizes of the cavities 70, 70, and also ensures that when an expandable adhesive 58 is placed in each of the four cavities 70, 70, 70 and 70, that it can only expand outward and provide a secure attachment with different portions of the inner periphery of the second hollow frame member 12, 14, 76 or 78.

Referring now to FIG. 6, a frame assembly 74 is shown which includes first, second, third and fourth hollow frame members, 12, 14, 76 and 78 respectively. All four hollow frame members 12, 14, 76 and 78 are identical in construction. Each of the four hollow frame members 12, 14, 76 and 78 can be constructed from various materials known to those skilled in the art. For example, each of the four hollow frame members 12, 14, 76 and 78 can be constructed from aluminum, plastic, a thermoplastic, a composite material, fiberglass, nylon, a metal, a metal alloy, steel, a steel alloy, etc. Desirably, all four of the hollow frame members 12, 14, 76 and 78 are constructed from the same material, although they do not have to be.

As depicted in FIG. 6, the first and third hollow frame members, 12 and 76 are of the same length and are shorter than the second and fourth hollow frame members, 14 and 78 respectively. Likewise, the second and fourth hollow frame members 14 and 78 are of the same length. When all four of the hollow frame members 12, 14, 76 and 78 are of the same length, a frame assembly having a square shape is produced. When the first and third hollow frame members, 12 and 76 respectively, are either shorter or longer than the second and fourth hollow frame members, 14 and 78 respectively, a frame assembly 74 having a rectangular shape is produced, as is shown in FIG. 6.

Referring now to FIG. 7, each of the four hollow frame members, 12, 14, 76 and 78, has a top wall 80, a bottom wall 82 and a pair of sidewalls 84 and 86 joining the top wall 80 to the bottom wall 82 and forming an inner periphery 88. The inner periphery 88 is shown as a rectangle although other geometrical shapes can be utilized. A square or rectangular shape is commonly used. A plurality of ribs 90 can be formed on the inner periphery 88 of each of the four hollow frame members 12, 14, 76 and 78. Each of the plurality of ribs 90 extends longitudinally through each of the four hollow frame members 12, 14, 76 and 78. The plurality of ribs 90 can vary in size and shape. The plurality of ribs 90 are spaced apart from one another and are relatively small in size having a height of less than about 0.15 inches. Desirably, each of the plurality of ribs 90 has a height of less than about 0.10 inches. The plurality of ribs 90 function to provide a snug and/or tight connection between the corner bracket 10 and the inner periphery 88 of each of the four hollow frame members 12, 14, 76 and 78. Alternatively, the plurality of ribs 90 could provide an interference fit between the corner bracket 10 and the inner periphery 88 of each of the four hollow frame members 12, 14, 76 and 78, if desired.

It should be understood that the plurality of ribs 90 could be eliminated, if they are not needed.

Each of the four hollow frame members 12, 14, 76 and 78 has a first channel 92 extending upward from the top wall 80. The first channel 92 has a pair of spaced apart sidewalls 94 and 96 with an open top surface 98 and a pair of open ends 100 and 102. At least one of the sidewalls 94 and 96 of the first channel 92, can be an extension of one of the pair of sidewalls 84 and 86 of the four hollow frame members 12, 14, 76 or 78. As depicted, the sidewall 94 is an extension of the sidewall 84 and the sidewall 96 is an extension of the sidewall 86.

Still referring to FIG. 7, each of the hollow frame members 12, 14, 76 and 78 has a width $w_1$. The width $w_1$ can vary in dimension. The width $w_1$ should be at least about 0.25 inches. Desirably, the width $w_1$ ranges from between about 0.3 inches to about 2 inches. More desirably, the width $w_1$ ranges from between about 0.4 inches to about 1.5 inches. Even more desirably, the width $w_1$ ranges from between about 0.5 inches to about 1 inch. Most desirably, the width $w_1$ is less than about 1 inch. The width $w_1$ of each of the hollow frame members 12, 14, 76 and 78 can be equal to the width w of the corner bracket 10.

Referring again to FIG. 6, the frame assembly 74 includes four corner brackets 10, 10, 10 and 10 each having a hollow base member 16, a top wall 18, four sidewalls 20, 22, 24 and 26 joined to the top wall 18, and having an open bottom surface 28. Each of the hollow base members 16 has a hollow tube 30 positioned therein and having a height h. The hollow tube 30 extends parallel to the height h. The hollow tube 30 can be utilized as was explained above. The hollow base member 16 including a channel 32 having a pair of spaced apart walls 34 and 36. Each of the pair of spaced apart walls 34 and 36 is an extension of two of the four sidewalls 20, 22, 24 and 26. The channel 32 has an open top surface 38 and an open end 40 facing away from the hollow base member 16. The open end 40 actually faces away from the sidewall 22 of the corner bracket 10. Each of the pair of spaced apart walls 34 and 36 of the channel 32 serves as a track for a sliding door which will be more fully discuss below.

An expandable adhesive 58 can be used to secure each of the four hollow frame members 12, 14, 76 and 78 to the four corner brackets 10, 10, 10 and 10.

Referring again to FIG. 6, the frame assembly 74 includes a pair of doors 104 and 106. The door 104 is enclosed in a door frame 108 and the door 106 is enclosed in a door frame 110. The pair of doors 104 and 106 can vary in size, shape and material from which they are constructed. Desirably, each of the pair of doors 104 and 106 is identical in size and shape. The doors 104 and 106 can be constructed of glass, PLEXIGLAS, a sheet of acrylic, a transparent material, a solid material, a metal mesh, a wire mesh, a screen, cloth, etc. By a "sheet of acrylic" it is meant a sheet formed from an acrylic resin. Two rectangular doors 104 and 106 of the same size are depicted in FIG. 6. Each of the pair of doors 104 and 106 is enclosed in a door frame, 108 and 110 respectively. Desirably, the entire outer periphery of each of the pair of doors 104 and 106 is enclosed by one of the door frames 108 and 110. The pair of door frames 108 and 110 is slidably mounted in the frame assembly 74.

Referring now to FIG. 8, the door frames 108 and 110 include an H-shaped member 112. The H-shaped member 112 has a first channel 114 and an oppositely aligned second channel 116. The first and second channels, 114 and 116 respectively, are coaxially aligned. By "coaxial" it is meant having or mounted on a common axis. The first channel 114 engages with one of the sidewalls 94 or 96 of one of the hollow frame members 12, 14, 76 and 78. The first channel 114 has a width $w_2$. The width $w_2$ of the first channel 114 can be dimensioned such that the pair of door frames 108 and 110 can easily slide on one of the sidewalls 94 or 96. Each of the sidewalls 94 and 96 provide a track for the first channels 114, 114.

Still referring to FIG. 8, the second channel 116 of the door frame 108 supports the door 104 and the second channel 116 of the door frame 110 supports the door 106. The door 104 and its frame 108 are identical in construction to the door 106 and its frame 110. Each of the pair of doors 104 and 106 should snugly and/or tightly fit into its respective second channel 116, 116. No slop should be present between the doors 104 or 106 and its respective second channel 116, 116.

The pair of doors 104 and 106 via the door frames, 108 and 110 respectively, can slide back and forth between an open position and a closed position. At least a portion of one door 104 can move or slide relative to the other door 106 when it is moved between an open position and a closed position. The actual size of the doors 104 and 106 will determine the extent each can travel.

It should be understood that only one sliding door 104 could be used, if desired. Likewise, it is possible to construct the frame assembly 74 such that the door 106 remains stationary.

Returning to FIGS. 3 and 7, it should be understood that each of the four corner brackets 10, 10, 10 and 10 has a width w and each of the four hollow frame members 12, 14, 76 and 78 has a width $w_1$. The width w of a corner bracket 10 could be equal to the width $w_1$ of each of the four hollow frame members 12, 14, 76 or 78. Alternatively, the width w of a corner bracket 10 could be made larger or smaller than the width $w_1$ of each of the four hollow frame members 12, 14, 76 and 78.

Referring now to FIGS. 9 and 10, an aquarium 118 for housing an amphibian, lizard or reptile is shown. The aquarium 118 can vary in size and shape. The aquarium 118 can be constructed out of various materials, including but not limited to: wood, metal, plastic, a thermoplastic, a composite material, glass, clear glass, tinted glass, PLEXIGLAS®, a transparent material, sheets of acrylic, a solid opaque material, etc. PLEXIGLAS® is a registered trademark of Rohm and Hass Company having an office at Independence mall, West Philadelphia, Pa. 19105. PLEXIGLAS® is a light transparent, weather-resistant thermoplastic.

The aquarium 118 includes a front wall 120, a back wall 122 and a pair of sidewalls 124 and 126, all of which extend upward from a bottom wall 128 and are secured thereto. The front wall 120 has a height $h_1$. The height $h_1$ of the front wall 120 is shorter in height than the back wall 122 or the pair of sidewalls 124 and 126. The reason for this is that a frame assembly 74 will be secured to the upper portion of the front wall 120 and be secured to the pair of sidewalls 124 and 126 as well.

It should be understood that the aquarium 118 is shown and described as a rectangular cube. However, the aquarium 118 could be constructed with three or more upstanding sides. The aquarium 118 could have any imaginable geometrically shape. For example, the aquarium 118 could be a polygon. Likewise, the aquarium 118 could have a round or circular cross-section, a triangular cross-section, a pentagon cross-section, a hexagon cross-section, etc.

Referring to FIG. 8, the aquarium 118 includes the frame assembly 74. The frame assembly 74, as described above, includes four hollow frame members 12, 14, 76 and 78 each having a top wall 80, a bottom wall 82 and a pair of sidewalls 84 and 86 joining the top wall 80 to the bottom wall 82 and forming an inner periphery 88. Each of the four hollow frame members 12, 14, 76 and 78 has a first channel 92 extending upward from the top wall 80. The first channel 92 has a pair of spaced apart sidewalls 94 and 96 with an open top surface 98 and a pair of open ends 100 and 102. Each of the pair of spaced apart sidewalls 94 and 96 of the first channel 92 serves as a track for one of the door frames 108 and 110. The frame assembly 74 also includes four corner brackets 10, 10, 10 and 10 each including a hollow base member 16 having a top wall 18, four sidewalls 20, 22, 24 and 26 joined to the top wall 18, and having an open bottom surface 28, The hollow base member 16 has a hollow tube 30 positioned therein and having a height h. The hollow tube 30 extends parallel to the height h. The hollow base member 16 also includes a channel 32 having a pair of spaced apart walls 34 and 36. Each of the pair of spaced apart walls 34 and 36 is an extension of two of the four sidewalls 12, 14, 76 and 78. As shown in FIG. 1, the wall 34 is an extension of sidewall 20 and the wall 36 is an extension of sidewall 24. The channel 32 also has an open top surface 38 and an open end 40 facing away from the hollow base member 16. Each of the pair of spaced apart walls 34 and 36 of the channel 32 serve as a track for one of the door frames 108 and 110.

It should be understood that the channel 32 is relatively short in length but it allows one of the pair of door frames 108 and 110 to enter therein, engage and completely seal off any opening between the door frames 108 or 110 and one of the four hollow frame members 12, 14, 76 and 78, This engagement is sufficient in preventing any crickets from escaping there through.

Still referring to FIGS. 9 and 10, the frame assembly 74 also has a periphery 130, see FIG. 10. A portion of the periphery 130 is secured to both the front wall 120 and to the pair of sidewalls 124 and 126 to form an enclosure 132, see FIG. 9. The frame assembly 74 can be secured in place using a chemical bonder such as: glue, an adhesive, a co-adhesive, or by using a mechanical fastener. Desirably, the frame assembly 74 is bonded to the front wall 120 and to the two sidewalls 124 and 126 with glue. The enclosure 132 has an open top 134. A pair of doors 104 and 106 is slidably mounted within the frame assembly 74 via the pair of door frames 108 and 110. Each of the pair of doors frames 108 and 110 has an H-shape, with a first channel 114 which engages with one of the pair of sidewalls 94 and 96 of the first channel 92 to form a track on which it can slide. The second channel 116 of the H-shape engages with the actual door 104 or 106.

The open top 134 of the enclosure 132 is closed by a cover 136 to form the amphibian aquarium 118 for an amphibian, a lizard or a reptile. The cover 136 can be constructed out of a solid material or be a frame having a material, with a plurality of openings formed therein, attached to the frame. The cover 136 is designed to allow air and light to pass there through. Various materials can be used to construct the cover 136. When the cover 136 is solid with no openings, it can be constructed of glass, PLEXIGLAS, a sheet of acrylic, a transparent material, a non-transparent material, wood, metal, plastic, a thermoplastic, fiberglass, a composite material or any other material known to man. When the cover 136 contains a plurality of openings, it can be constructed of a metal mesh, a wire mesh, a screen, fine netting, cloth, such as cheese cloth, etc. Desirably, the cover 136 is made out of a material having a plurality of small openings to allow air to circulate through the aquarium 118. The cover 136 is depicted as being removable. However, the cover 136 could be permanently secured to the enclosure 132, if desired.

Referring again to FIG. 9, the aquarium 118 for an amphibian, a lizard or a reptile is unique in that it differs from a standard fish aquarium. In the aquarium 118, the front wall 120 contains an upper edge 138. This means that the aquarium 118 can contain a quantity of water but will not be entirely filled with water. The water level can extend over a portion of or over the entire height $h_1$ of the front wall 120, up to the upper edge 138. The upper surface of the water should be located below the upper edge 138 of the front wall 120 because the pair of sliding doors 104 and 106 is not water tight. Rocks, a man-made platform formed from plastic or some other material, tree branches, limbs, ropes, netting, dirt, etc. can be added to the aquarium 118 so that the amphibian, a lizard or a reptile has a place to lounge and rest when it is out of the water. For example, a turtle spends a majority of its life in the water but has to raise its head above the upper surface of the water in order to take a breath. The turtle is also accustomed to resting out of the water if a platform of some sort is provided.

While the invention has been described in conjunction with several specific embodiments, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:
1. A corner bracket for securing first and second hollow frame members together, comprising:
 a) a hollow base member having a top wall, four sidewalls joined to said top wall, and having an open bottom surface, said hollow base member having a height and having a hollow tube positioned therein and extending parallel to said height, said hollow base member including a channel having a pair of parallel walls, each of said pair of parallel walls being an extension of two of said four sidewalls, said channel having an open top surface and an open end facing away from said hollow base member, and each of said parallel walls of said channel serving as a track for a sliding door;
 b) a first hollow coupling member projecting upward from said top wall and being integrally formed therewith, said first hollow coupling member having four sidewalls substantially coincident with said four sidewalls of said hollow base member, said four sidewalls creating a hollow core in said first hollow coupling member which has an open upper end, at least one of said four sidewalls of said first hollow coupling member having a longitudinal groove formed there through and said longitudinal groove is aligned parallel to said height of said hollow base member and terminates at said open upper end, said longitudinal groove allowing an expandable adhesive placed in said hollow core to pass there through and contact an inner periphery of said first hollow frame member and hold said first hollow frame member secure to said corner bracket; and
 c) a second hollow coupling member having a pair of sidewalls formed integral with and projecting out from one of said four sidewalls of said hollow base member, said pair of sidewalls terminating at an end wall, said second hollow coupling member having a transverse partition aligned parallel with said end wall and integral with and connecting mid-portions of said pair of sidewalls, said pair of sidewalls extending to and terminating in parallel planes which are normal to said sidewall of said hollow base member, and said transverse partition creating cavities into which an expandable adhesive can be placed and which can contact an inner periphery of said second hollow frame member and hold said second hollow frame member secure to said corner bracket.

2. The corner bracket of claim 1 wherein said hollow tube is coincident with two of said four sidewalls.

3. The corner bracket of claim 1 wherein said corner bracket has a width measured perpendicularly across said pair of walls of said channel, and said width ranges from between about 0.3 inches to about 2 inches.

4. The corner bracket of claim 3 wherein said width is at least about 0.25 inches.

5. The corner bracket of claim 1 wherein said corner bracket is constructed from nylon.

* * * * *